UNITED STATES PATENT OFFICE.

HENRY HIRSCHING, OF OAKLAND, CALIFORNIA.

PROCESS OF RECOVERING VALUES FROM ORES.

1,190,549.                 Specification of Letters Patent.     Patented July 11, 1916.

No Drawing.        Application filed November 28, 1913.   Serial No. 803,480.

*To all whom it may concern:*

Be it known that I, HENRY HIRSCHING, a citizen of the United States, and a resident of Oakland, in the county of Alameda and State of California, have invented certain new and useful Improvements in the Process of Recovering Values from Ores, of which the following is a full, clear, and exact description.

This invention relates to the extraction of values, in particular copper, silver and gold, or any one or two of these three metals, from ores or tailings containing the same. Certain ores are directly attacked in the raw state by the solvent which I employ; others require a preliminary oxidation to convert the metals into forms soluble in the solvents which I employ.

The following is a description of my process as applied to ores containing copper, silver and gold. Such ores may be divided into two classes, namely, carbonates or oxids, on the one hand, and sulfids on the other. Ores of the second class must be first subjected to a roast to transform them into oxid, which makes the ore soluble in the solvent used. Ores in the form of oxids enter my process without further preparation, except such crushing and other mechanical operations as are known to all persons skilled in the art. The comminuted roasted ore, generally copper, silver and gold, or the comminuted similar raw ore, as the case may be, is then brought into contact with aqueous ammonia. This extracts, as a rule, all the copper and the whole or a part of the silver contained in the ore. The silver may be present as salts of chlorid, iodid and bromid, which are dissolved in aqua ammonia. The tailings, that is to say, the insoluble residue from the extraction, contain some of the silver and all of the gold in the original ore. The silver and the gold are present in the metallic state. The liquor obtained by this extracting process is drawn off to a boiler and boiled with steam. Ammonia is driven off and passed to a cooler, in which it is condensed to be used again in treating the next batch of ore. As the ammonia is expelled from the liquor, the copper and silver contained therein are precipitated in the form of a black powder. The colorless supernatant liquor remaining at the end of the operation may still contain silver, which I precipitate as silver chlorid by the addition of sodium chlorid. The precipitate thus obtained is washed, pressed and dried, and sent to the refinery.

The black powder of the precipitate, which may contain silver and copper, is conducted to a dissolving tank and is dissolved in diluted sulfuric acid. The solution is filtered through asbestos or quartz and is then conveyed to electrolyzing vats, in which the copper is deposited electrolytically. I commonly employ a current strength of 40 amperes per square foot in this operation. Any silver present in the solution collects in the slimes at the bottom of the electrolytic cells, and is pressed and sent to the refinery. If no silver is present, the process for the recovery of the copper is the same as first described. The liquid remaining after the precipitation of the copper contains sulfuric acid, and is employed over again.

The tailings from the first extraction (by ammonia) may contain silver and gold. They are brought into a cyaniding vat and extracted with cyanid of potash or soda to recover the silver and gold, or either one of these metals if the other is absent. If the tailings do not readily yield to cyanid extraction, they may be treated with mercury by the amalgamation process. The amalgam is then sent to the refinery.

Having thus described my invention, I claim as new and desire to secure by Letters Patent:

A process for recovering copper, silver and gold from roasted or unroasted ores, consisting in acting on the ore with aqueous ammonia, thereby dissolving the copper and the silver, expelling the ammonia from the solution, thereby causing a precipitate from the solution of the black copper oxid and silver oxid, settling and decanting, dissolving the precipitate with sulfuric acid, electrolyzing to deposit copper, recovering the silver, and recovering the gold from the ore residue substantially as and for the purpose set forth.

In testimony whereof I have signed my name to this specification in the presence of two subscribing witnesses.

HENRY HIRSCHING.

Witnesses:
WM. N. THORPE,
R. E. FRENCH.